United States Patent Office 2,778,399
Patented Jan. 22, 1957

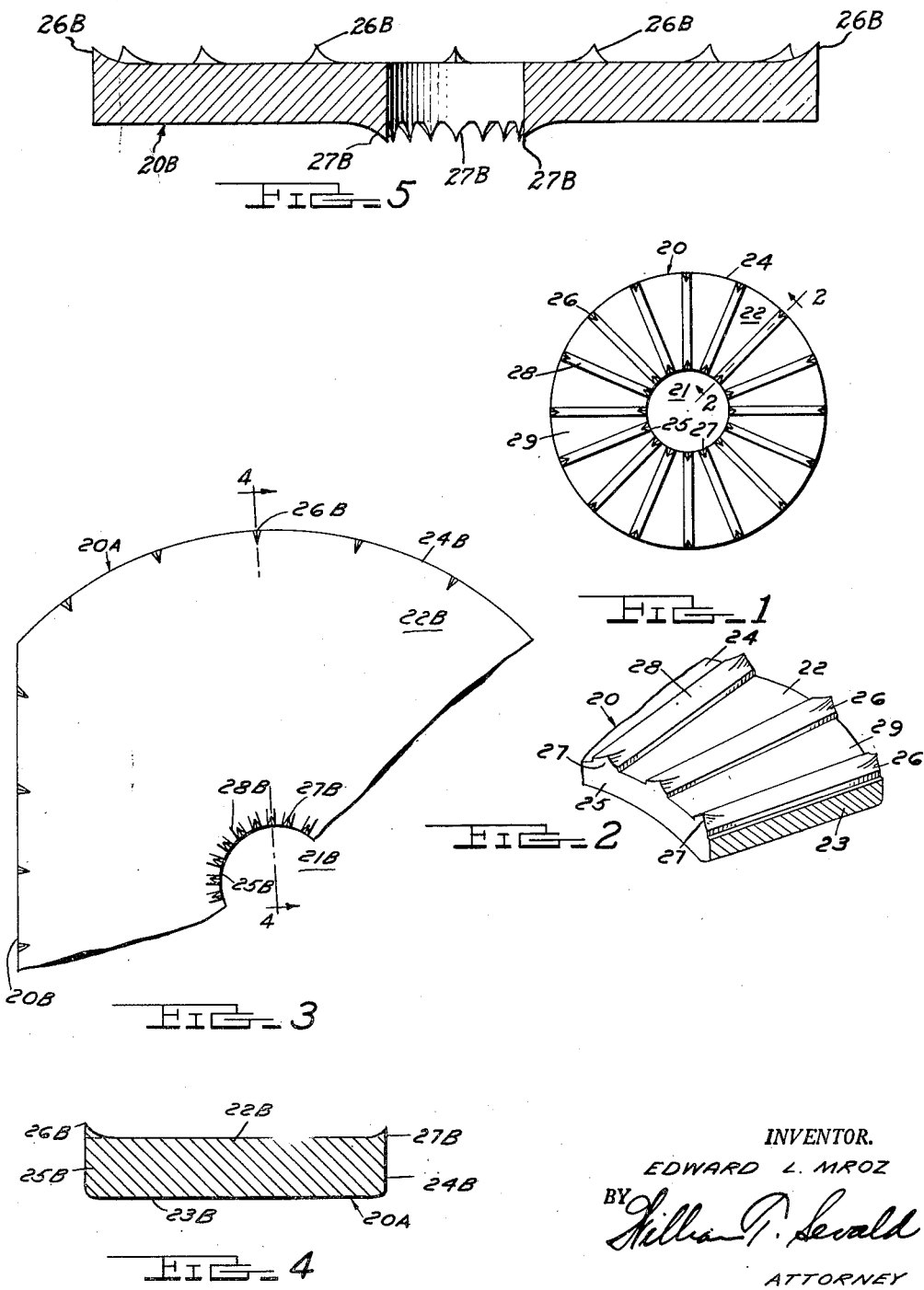

2,778,399

WASHER HAVING BITING TEETH ON INNER AND OUTER PERIPHERY THEREOF

Edward L. Mroz, Detroit, Mich.

Application April 24, 1953, Serial No. 350,947

4 Claims. (Cl. 151—35)

This invention relates to grip articles such as lock washers and more particularly to a grip article having hardened barbs, burrs, tangs, or spurs on at least one face thereof which are adapted to bite into and embed themselves in an adjacent surface when forced thereagainst so that the barbs effect a mechanical interconnection between the washer and the adjacent surface.

The prior art is indicative of many attempts to provide grip articles such as lock washers but these have not proven entirely satisfactory for many reasons, such as the articles becoming loose. The prior art is also indicative of acute desirability and utility of the instant article.

As an illustration, the instant grip article or lock washer is particularly suitable for fixing the longitudinal adjustment of an assembly relative to a slotted rail or panel such as in automobile hood mechanisms, trunk locks, etc. The instant article is faced toward the slotted member, the adjustment made, and the bolt and nut tightened so that the barbs bite into the body of the slotted member preventing sliding movement of the bolt in the slot. The barbs of the article so bite into the adjacent material that a mechanical interconnection therebetween is accomplished which interconnection prior art lock washers have not entirely satisfactorily accomplished in use as the prior art washers and the adjacent surfaces are not properly interconnected. The proper interconnection between the article and the adjacent surface requires that some portion of the article become almost an integral part of the adjacent surface so that relative motion between the adjacent surface and the article is absolutely prohibited.

With the foregoing in view, it is a primary object of this invention to provide a grip article which is adapted to embed a portion of itself such as a barb into a surface in positive engagement or interconnection with the latter making relative movement between the article and the adjacent surface impossible.

Another object of the invention is to provide a lock washer having hardened barbs thereon adapted to embed themselves into an adjacent surface so that the washer and the adjacent surface becomes practically an integral structure whereby relative movement between the washer and the surface is precluded.

Another object of the invention is to provide a lock washer having pointed tangs or barbs on a surface thereof adapted to bite into a bearing surface and act as radial lever arms on the washers to prevent rotation of the washer relatively to the bearing surface.

Still another object is to provide a lock washer having barbs on both surfaces thereof thereby permitting two surfaces to be spaced by the washer in non-rotational relationship to the washer and to each other such as between two sheets of metal, adjacent the bolt head face when the nut is turned tight, and adjacent the nut face when the bolt is turned tight.

These and other objects and advantages will be pointed out specifically or will become apparent from a reading of the specification when considered in conjunction with the accompanying drawings wherein:

Fig. 1 is an enlarged bottom plan view of a small lock washer formed according to the invention;

Fig. 2 is an enlarged fragmentary cross-sectional perspective view of the washer illustrated in Fig. 1 and taken on the line 1—1 of Fig. 1;

Fig. 3 is an enlarged fragmentary bottom plan view of a large washer having a clipped edge formed according to the invention;

Fig. 4 is a cross-sectional view of the washer illustrated in Fig. 3 and taken on the line 4—4 of Fig. 3; and Fig. 5 is a cross-sectional view on a diameter of a lock washer having barbed teeth on both sides thereof.

Referring now to the drawings wherein like numerals refer to like and corresponding parts throughout the several views the inventive washer comprises a body 20, usually annular in configuration but which may take the form of a body 20A having one or more flat or clipped sides 20B as shown in Fig. 8. The body 20 or 20A is provided with a bolt receiving center aperture or hole 21 or 21B, a face 22 or 22B, a back 23 or 23B, an outer periphery 24 or 24B, and an integral edge 25 or 25B defining the center aperture 21 or 21B. The face 22 or 22B of the body 20 or 20A or 20B is provided with a plurality of radially outer barbs 26 or 26B adjacent the periphery 24 or 24B and the face is also provided with a plurality of radially inner barbs 27 or 27B adjacent the edge 25 or 25B of the center aperture. The barbs are an integral part of the face of the body and extend thereabove terminating in peaks or points as will be apparent from Fig. 9. Joining the radially inner and outer barbs are optional ridges 28 or 28B which may be either completely or partly formed on the face 22 or 22B and located on radii between the outer and inner barbs, the ridges being separated by truncated, wedge-shaped triangular areas 29 constituting the main area and plane of the face 22 or 22B when the ridges 28 or 28B are employed.

It is to be particularly noted that the peak or apex of the outer barbs 26 is located at the points of intersection of radii and the periphery 24 and that the barbs 26 slops downwardly on either side of the apex along the periphery 24 and inwardly along radii so that each barb 26 is substantially triangular in cross-section taken either along a radii or at 90° variation thereto at the periphery 24, so that each barb resembles one half a pyramid which has been cut in two downwardly through the apex.

The inner barbs 27 are similar to the outer barbs except that they are located at the center hole edge 25 and are relatively smaller and closer together than the outer barbs 26. It is to be noted that the inner barbs are located at the points of intersection of radii and the internal edge 25 and that the side edges of the inner barbs 26 converge upwardly from the inner edge 25 and the front of the inner barbs are inclined away from the outer barbs 26 along radii. The inwardly facing back of each inner barb 27 is on the same plane as the cylinder of the inner edge 25. The outwardly facing back of each outer barb 26 is on the same plane as the cylinder of the outer periphery 24.

Figs. 1 and 2 show a lock washer having the radial ridges whereas Figs. 3 and 4 show a lock washer having a substantially plain or flat area between the outer and inner barbs with only partially formed ridges 2SB adjacent the inner barbs. The clipped edge 30, Fig. 3, carries the outer barbs 26B as it constitutes part of the periphery 24B.

It can now be seen that the inventive lock washers may be formed with outer barbs 26 and inner barbs 27 with or without interconnecting radial ridges 28 which ridges 28 are preferably rectangular in cross-section. Obviously, a washer may be formed wherein only the inner or outer barbs 26 annd 27 may be employed as desired; also partially or fully formed ridges 28 may be used as desired as hereinafter more fully explained in conjunction with the manufacture or fabrication of the inventive lock washers.

The fabrication of the lock washer is completed by subjecting it to hardening and plating processes to assure that the barbs will bite into or embed themselves in an adjacent surface when clamped thereagainst and to eliminate the possibility of the washer being deteriorated by rust. Any suitable hardening process may be used and one which has met with considerable success is a well known cyanide process of such duration as to harden the washer to a depth of approximately .003–.005 inch. The cyanide process produces extremely hard barbs so that when they are clamped against an adjacent surface the barbs embed themselves in the adjacent surface and thus unite the washer and adjacent surface into a practically integral unit, relative motion between the two being impossible without failure of one or both of the elements.

While the invention has been shown and described in detail it is obvious that it is susceptible of many variations. For example, a washer could be formed having barbs not only on one face thereof but also on both faces. This disclosure, therefore, is to be considered as illustrative only, the invention being defined in the appended claims. It is also obvious that a slotted rail or part could be equipped with barbs when the slot is punched out according to the invention.

I claim:

1. A washer having gripping and reinforcing characteristics comprising a member having a first face with diametrically opposed plane portions adapted to engage a flat workpiece and inner and outer peripheral edges substantially normal to said first face, a second flat face parallel to said first face, and teeth disposed on said first face adjacent both said edges and equally spaced from each other by relatively substantial distance; each said tooth having an equilateral triangular back portion lying on the plane of one said edge with the equilateral sides thereof rising above the plane of said face and terminating in an upwardly directed point at the plane of said edge and having an arcuately sloping portion leading from said point and sides inwardly from said edge and merging with said face; said member being adapted to lie with its face contiguous to a surface to reinforce same and said teeth being adapted to penetrate into material behind the contiguous surface.

2. In a washer as set forth in claim 1, said teeth adjacent one said edge being disposed on the opposite face to said teeth adjacent the other said edge.

3. In a washer as set forth in claim 1, said teeth adjacent said inner edge being paired with said teeth adjacent said outer edge.

4. In a washer as set forth in claim 3, wherein said opposed plane portions are provided with radially extending grooves between the pairs of teeth.

References Cited in the file of this patent
UNITED STATES PATENTS

| Number | Name | Date |
|---|---|---|
| 464,301 | Harvey | Dec. 1, 1891 |
| 684,673 | Clark | Oct. 15, 1901 |
| 715,891 | Somerby | Dec. 16, 1902 |
| 2,054,187 | Almdale | Sept. 15, 1936 |
| 2,228,217 | Olson | Jan. 7, 1941 |
| 2,247,981 | Washer | July 1, 1941 |
| 2,350,756 | Heinold | June 6, 1944 |
| 2,352,265 | Kapple et al. | June 27, 1944 |